United States Patent
Rutten et al.

[11] 3,777,790
[45] Dec. 11, 1973

[54] SILAGE GUIDE
[75] Inventors: Donald E. Rutten, Plainfield; Richard A. Davis, Joliet, both of Ill.
[73] Assignee: P & D Mfg. Co., Inc., Plainfield, Ill.
[22] Filed: Mar. 3, 1972
[21] Appl. No.: 231,575

[52] U.S. Cl.................. 141/392, 141/286, 239/222
[51] Int. Cl.............................................. B65b 1/04
[58] Field of Search...................... 214/17; 221/211; 21/83; 302/60; 141/286, 392; 239/513, 522, 523

[56] References Cited
UNITED STATES PATENTS
2,154,731   4/1939   Crowley............................ 239/513

Primary Examiner—Houston S. Bell, Jr.
Attorney—A. W. Molinare et al.

[57] ABSTRACT

Silage guide for distributing silage in a storage container comprising a base plate, a pair of downwardly turned outer arcuate deflector members positioned on the bottom of the base plate preferably near the side edges, and a pair of outwardly turned inner arcuate deflector members positioned on the bottom of the base plate interior of the outer deflector members. Preferably a second pair of outwardly turned arcuate deflectors are positioned interior of the inner deflector members. The outer downwardly turned deflectors direct silage near the perimeter of the storage container and the inner outwardly turned deflectors direct silage across its cross section.

13 Claims, 3 Drawing Figures

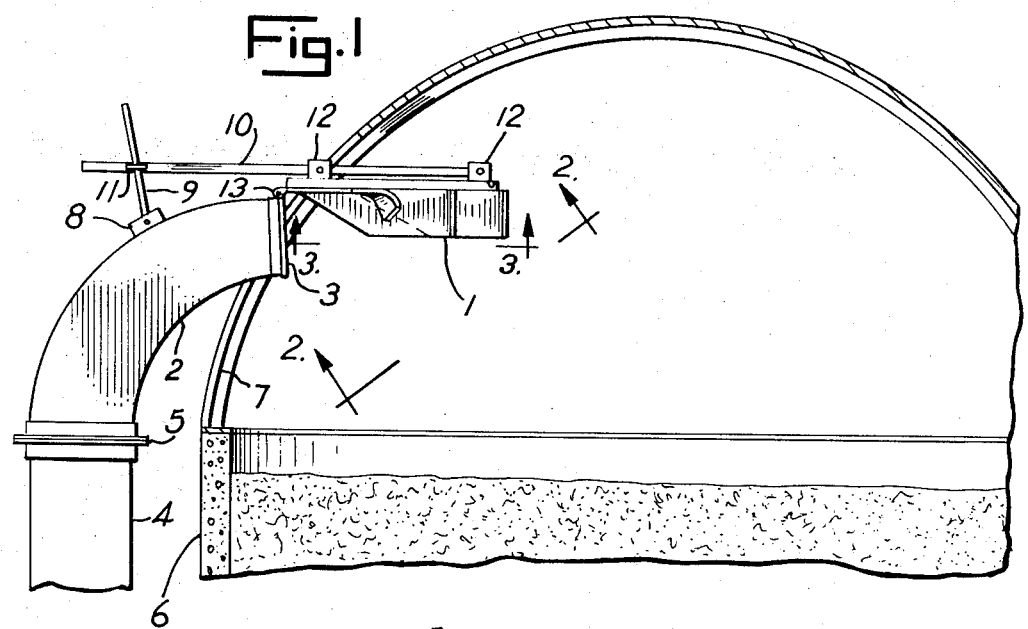
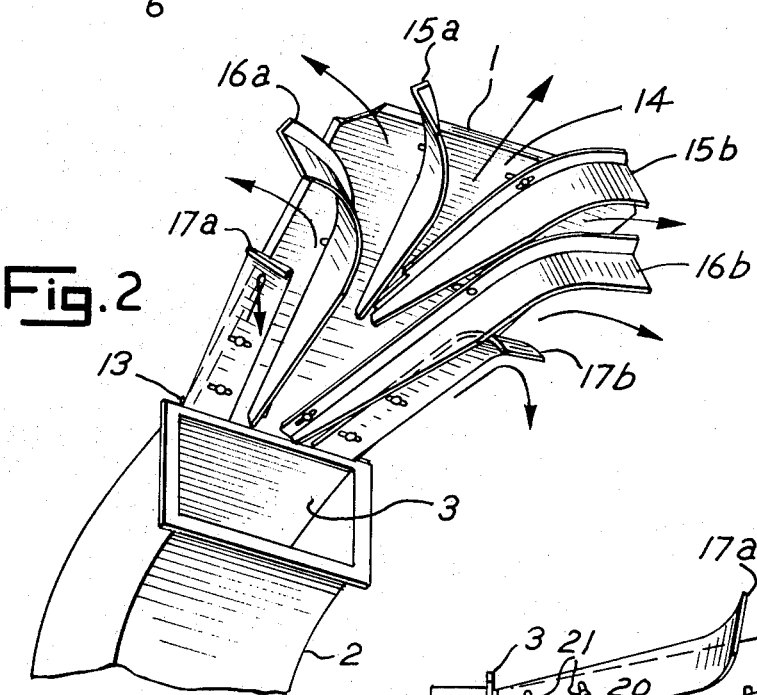
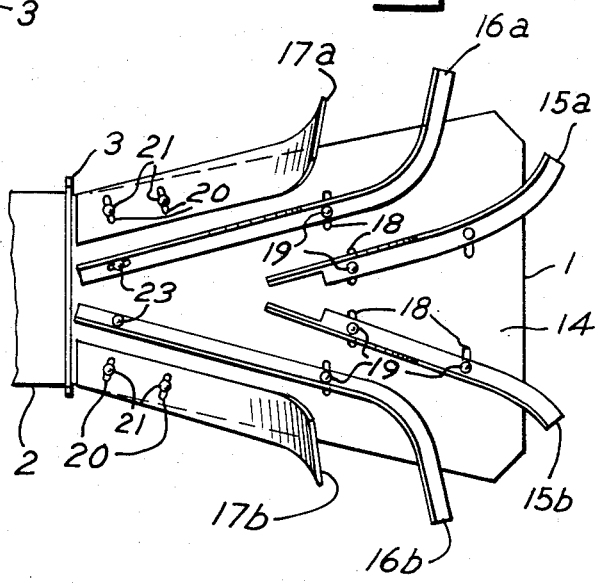

SILAGE GUIDE

BACKGROUND OF THE INVENTION

This invention pertains to an apparatus for uniformily distributing ensilage, grain, or other solid particulate material in a silo, bin or other storage container. More particularly, this invention pertains to solids distributor for uniformly distributing silage in a silo.

It is important that silage be uniformly distributed in a tower silo, when the tower is filled since uneven distribution causes separation of the constituents in the silage and, often places undue stresses on the silo structure. When the constituents of the silage become separated, air pockets often form that adversely affect the fermentation process and the weight distribution of the silage in the silo.

The art has long recognized this disbrution problem and has devised various means and devices to effect an even distribution of the silage as it flows into the tower. These distribution devices, however, generally include complex auxiliary mechanisms utilizing rotating or orbital distributors to effect the distribution. These rotating distributors use various mechanisms to rotate a blade or vane and require continuous maintenance and repair as well as being expensive to initially construct and install. Typical mechanisms using rotating distributors are illustrated by U.S. Pat. Nos. 2,788,155; 3,175,668; 3,206,044; 3,232,458; 3,269,780; 3,446,572; and 3,565,268.

The art has also developed stationary silage distributors which utilize no moving parts such as the distributor illustrated in U.S. Pat. No. 3,321,252. The distributor embodied in this patent divides the flow from a conduit into three segments; the outer segments being deflected outwards and the middle segment being deflected downwards. While distributing silage emanating from a conduit in a silo in a better manner than no distributor at all, this distributor fails to provide a completely uniform distribution. In diverging the main flow of silage into only three paths, including a single downward path, the silage is directed towards only three points on the cross sectional area of the silo. Distribution to other points in the silo depends on manual labor or gravity flow. Furthermore, this distributor comprises several deflectors of differing shape and construction and cannot be manufactured in a facile manner.

SUMMARY OF THE INVENTION

It is an object of this invention to provide a solid distributor capable of uniformly distributing solids without the utilization of moving parts.

It is another object of this invention to provide a solid distributor which can be constructed in a facile manner.

It is a further object of this invention to provide a simple, inexpensive solid distributor capable of producing a uniform distribution of solids over a relatively large area.

In an embodiment, the present invention relates to an apparatus for distributing solid particulate material to a storage container from a discharge conduit. Positioned adjacent to the discharge conduit, and preferably adjacent to the top edge portion of the conduit is a distributor comprising a base plate having deflector members mounted on the bottom portion of the plate. More particularly, a pair of spaced apart downwardly turned outer deflector members, preferably having an arcuate shape are positioned on the bottom portion of the base plate. Each of these downwardly turned deflectors is proximate with a wall portion of the discharge conduit and directs solids emanating from the discharge conduit towards the perimeter of the storage container. Also positioned on the bottom portion of the base plate is a pair of outwardly turned, inner deflector members. Each of these inner deflector members is positioned interior of each outer downwardly turned deflector member and directs solids across the cross sectional area of the storage container. Preferably, this inner deflector is positioned perpendicular to the base plate and is tapered from an intermediate point, back, to the back edge of the base plate.

In a more limited embodiment, a second pair of outwardly turned inner deflector members are positioned on the bottom portion of the base plate with each member being positioned interior of the first inner deflector members. The addition of these second, outwardly turned arcuate deflector members divides the solid flow from the conduit into two additional flow paths and helps insure a more uniform distribution of solids across the cross sectional area of the storage container.

Other objects, embodiments and a more detailed description of the foregoing embodiment will be found by reference to the following more detailed description of the invention.

BRIEF DESCRIPTION OF THE DRAWINGS

A preferred configuration of the inventive distributing device is illustrated in the drawings accompanying this invention.

FIG. 1 is a side, elevational view of the solids distributor or guide assembly in relationship to a discharge conduit and a silo.

FIG. 2 is a bottom view of the guide assembly and discharge conduit taken along section line 2—2 of FIG. 1.

FIG. 3 is a detailed bottom view of the solid distributor taken along section line 3—3 of FIG. 1.

DETAILED DESCRIPTION OF THE INVENTION

In FIG. 1 a solids guide assembly 1 is connected to gooseneck assembly or conduit 2 by means of a conventional hinge 13 extending along the back edge of distributor plate 14. Gooseneck assembly or conduit 2 is a conventional solids discharge conduit suitable for transferring silage through discharge opening 3 to silo 6 covered by silo roof 7. Gooseneck assembly 2 is mounted on filler pipe 4 by flange 5 in a manner well known to those trained in the art.

As illustrated, guide assembly 1 is positioned horizontally. However, guide 1 can be adjusted to positions other than horizontal to facilitate the distribution of silage in silo 6 through the cooperation of adjusting rod 9 and handle 10. More particularly, generally vertical adjusting rod 9 is connected by adjusting rod mounting angle 8 to gooseneck assembly 2. Handle 10 is positioned on the center axis of guide assembly 1 by means of connecting brackets 12. Guide eyelet 11, located on the rear end portion of handle 10, engages adjusting rod 9 to movably adjust the position of guide assembly 1 by rotation about hinge 13. In other words, adjusting rod 9 extends through guide eyelet 11 in handle 10. By moving handle 10 up and down in relation to adjusting rod 9, guide assembly 1 is rotated about hinge 13 thereby changing the position of the assembly 1 in relation to the discharge conduit and the silo. As indicated, by rotating guide assembly 1 about hinge 8, the trajectory of the silage discharged through conduit opening 3 can be readily varied to insure a uniform silage distribution in the silo and to adapt the distributor to different size silos and different type silage or other solids.

Referring now to FIGS. 2 and 3, guide assembly comprises base plate 14, left and right center outwardly turned arcuate deflector members 15a and 15b respectively; left and right outwardly turned intermediate arcuate deflector members 16a and 16b respectively; and, left and right downwardly turned arcuate deflector members 17a and 17b respectively. Preferably deflector members 15a, 15b, 16a and 16b are positioned perpendicular to base plate 14 and are tapered backwards from an intermediate point on the baffle towards the rear of the distributor plate to facilitate the interception of the silage emanating through conduit opening 3. This can be a linear taper as illustrated or a curved taper, i.e., concave or convex in shape. Also, the deflector members may be inclined at an angle to plate 14. Preferably intermediate arcuate deflectors 16a and 16b extend from the back of the guide assembly 1 near hinge 13 forward and outward across base plate 14. However, deflectors 16a and 16b may extend from an intermediate point on the plate. Center deflector members 15a and 15b, preferably extend from a point forward of the back edge of plate 14, preferably a point near the mid-section of the plate, forward and outward across the plate. However, deflectors 15a and 15b may extend from the back of guide assembly 1.

As illustrated, outer deflector member 17a and 17b are not only downwardly turned to deflect solids or silage near the perimeter of the silo, but are also slightly outwardly turned to insure a more uniform distribution of silage around the near perimeter of the silo in relation to the distributor. However, it is within the scope of this invention for deflector members 17a and 17b to be merely turned in a downward direction without being also turned in an outward direction. Likewise, deflectors 15a, 15b, 16a, and 16b may be downwardly turned in addition to being outwardly turned.

Similarly, base plate 14 is illustrated as being a trapezoid. However, other general configurations such as triangles, circles, and the like may be equally employed in this invention wherein the deflector members are arranged thereon as indicated.

Openings 18 and bolts 19 associated with deflector members 15a, 15b, 16a and 16b provide a means for adjusting the exact orientation of each deflector to meet a given situation such as varying silo diameters and silage types. However, once these deflectors are adjusted for a given silo and silage, their position need not thereafter be changed. In other words, openings 18 in plate 14 allow inner deflector members 15a, 15b, 16a and 16b to be adjusted laterally across base plate 14. Similarly, openings 20 in deflector members 17a and 17b cooperate with bolts 21 to allow adjustment of each of the respective members. In any event, it is preferred that each of the deflector members be spaced an equidistant apart in relation to the center of base plate 14 to insure that an equal amount of silage or other particulate solids is directed in all directions. Accordingly, rear bolts 23 are positioned near the rear end of deflector members 16a and 16b to insure that the respective deflector members are spaced an equidistance from either side of the center line of the distributor.

In operation for the distribution of silage in a silo, silage exists from gooseneck assembly 2 through opening 3 where it is engaged by the deflector members adjustably mounted on the underside of base plate 14 and is diverted in various flow directions. More particularly, silage emanating from opening 3 is intercepted by downwardly turned arcuate deflector members 17a and 17b to direct the silage to the near, perimeter of silo 6. Another portion of the silage is intercepted by first intermediate arcuate deflector members 16a and 16b and is directed across the near cross sectional area of the silo. The remaining silage passes down the center of the guide assembly where it is intercepted by second center curved arcuate deflector members 15a and 15b whereby the flow of silage is divided into three additional paths. Silage is then directed between deflector members 15a and 16a and 15b and 16b respectively to intermediate portions on the cross sectional area of the silo. Thus the remaining silage passes down the center of the guide between center deflector members 15a and 15b and is directed towards the far cross sectional area of the silo.

As a consequence, silage emanating from the gooseneck assembly is divided into seven independent paths which cover the cross sectional area of the silo with silage. The silage is diverted into two paths along the near perimeter of the silo and five paths across the remaining cross sectional area of the silo so as to readily effectuate a uniform distribution of silage over the large cross sectional area of the silo. This uniform distribution is obtained in silos up to 20 or 30 feet or more in diameter and is obtained with a guide assembly utilizing no moving parts and constructed in a facile manner.

While I have shown a presently preferred embodiment of the invention, it must be understood that this invention is not to be limited to the particular configuration shown since the guide assembly claimed may be otherwise embodied in alternative forms within the generally broad scope of the following claims. For example, there is illustrated two sets of inner arcuate deflector members. In certain situation, such as for small diameter silos, only one set of inner arcuate deflectors may be necessary. Similarly, an additional deflector or pair of deflectors may be positioned interior of deflectors 15a and 15b to further divide the silage flow across the silo. In addition, the deflector members illustrated are continuously curved. However, they may be simply bent or turned at a single point on the deflector to provide the necessary outward turning of the silage impinging on the deflectors. Further as preferred, the guide assembly is illustrated as being mounted on the top edge of a conduit. However, it is within the scope of this invention to mount the guide on either the bottom edge of the conduit or on one of the side edges with the deflectors positioned toward the silage flow.

We claim as our invention:

1. In an apparatus for distributing solid particulate material in a storage container including a discharge conduit having an opening therein for solids discharge with a top edge portion and at least two wall portions, the improvement which comprises a solids guide comprising:

i. a base plate having a bottom portion, a front edge and a back edge;
   ii. said back edge of said base plate adapted for positioning adjacent to the discharge conduit opening;

iii. a pair of spaced-apart, downwardly-turned, outer deflector members positioned on the bottom portion of the base plate, each member proximate with a wall portion of the discharge conduit for directing solids toward the perimeter of the storage container; and, iv. a pair of outwardly-turned, inner deflector members positioned on the bottom portion of the base plate each member positioned interior of each outer deflector member for directing solids across the area of the storage container.

2. The solids guide of claim 1 wherein said inner deflector members are positioned perpendicular to the base plate.

3. The solids guide of claim 1 wherein said inner deflector members extend from the back edge of the base plate forward and outward across the plate.

4. The solids guide of claim 3 wherein said inner deflector members are tapered from an intermediate point back to the back edge of the base plate.

5. The solids guide of claim 1 which includes a second pair of outwardly turned inner deflector members positioned on the bottom portion of the base plate, each member positioned interior of the first inner deflector members.

6. The solids guide of claim 5 wherein said second deflector members are positioned perpendicular to the base plate.

7. The solids guide of claim 5 wherein said second deflector members extend from a point spaced apart from the back edge of the base plate forward and outward across the plate.

8. The solids guide of claim 7 wherein said second deflector members are tapered from an intermediate point back toward the interior of the base plate.

9. The solids guide of claim 5 wherein each member of the first and second pair of inner deflector members are spaced equidistant from the center of the base plate.

10. The solids guide of claim 1 wherein the back edge of the base plate is hingedly connected to the top edge portion of the discharge conduit.

11. The solids guide of claim 10 which includes means for moving said base plate on said hinge to selectively regulate the path of the material passing from the conduit to the distributor.

12. The solids guide of claim 1 wherein the discharge conduit comprises a silage gooseneck.

13. The solids guide of claim 1 wherein the deflector members are adjustably positioned on the base plate.

* * * * *